April 25, 1939.　　　A. E. LARSEN　　　2,155,426
ROTATIVE-WINGED AIRCRAFT
Filed Sept. 9, 1935　　　7 Sheets-Sheet 1

INVENTOR
Agnew E. Larsen
BY
Synnestvedt & Lechner
ATTORNEYS

April 25, 1939.   A. E. LARSEN   2,155,426
ROTATIVE-WINGED AIRCRAFT
Filed Sept. 9, 1935   7 Sheets-Sheet 3

INVENTOR
Agnew E. Larsen
BY
Synnestvedt & Lechner
ATTORNEYS

April 25, 1939.  A. E. LARSEN  2,155,426

ROTATIVE-WINGED AIRCRAFT

Filed Sept. 9, 1935  7 Sheets-Sheet 4

INVENTOR
Agnew E. Larsen
BY
Synnestvedt & Lechner
ATTORNEYS

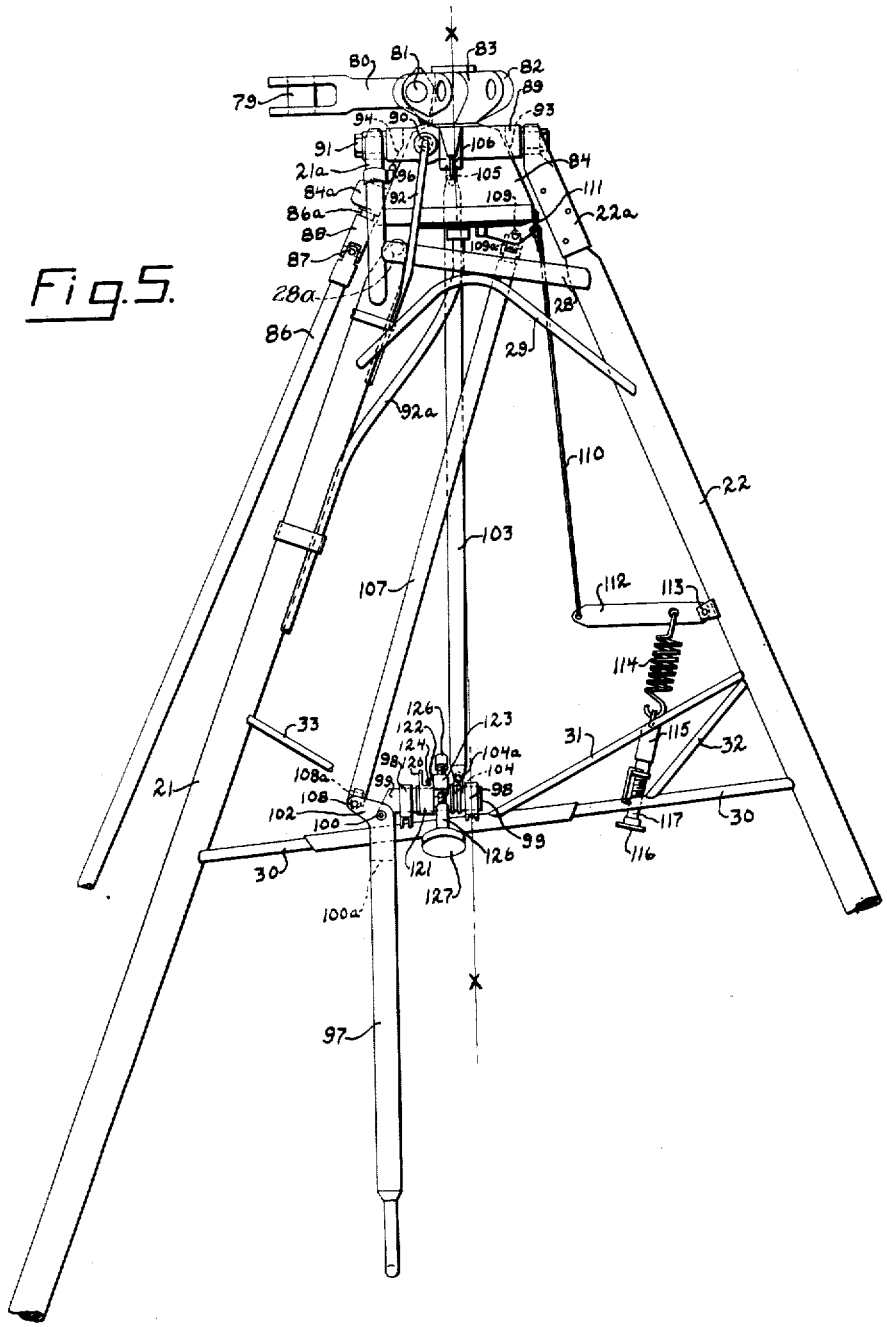

April 25, 1939.   A. E. LARSEN   2,155,426
ROTATIVE-WINGED AIRCRAFT
Filed Sept. 9, 1935   7 Sheets-Sheet 6

INVENTOR
Agnew E. Larsen
BY
ATTORNEYS

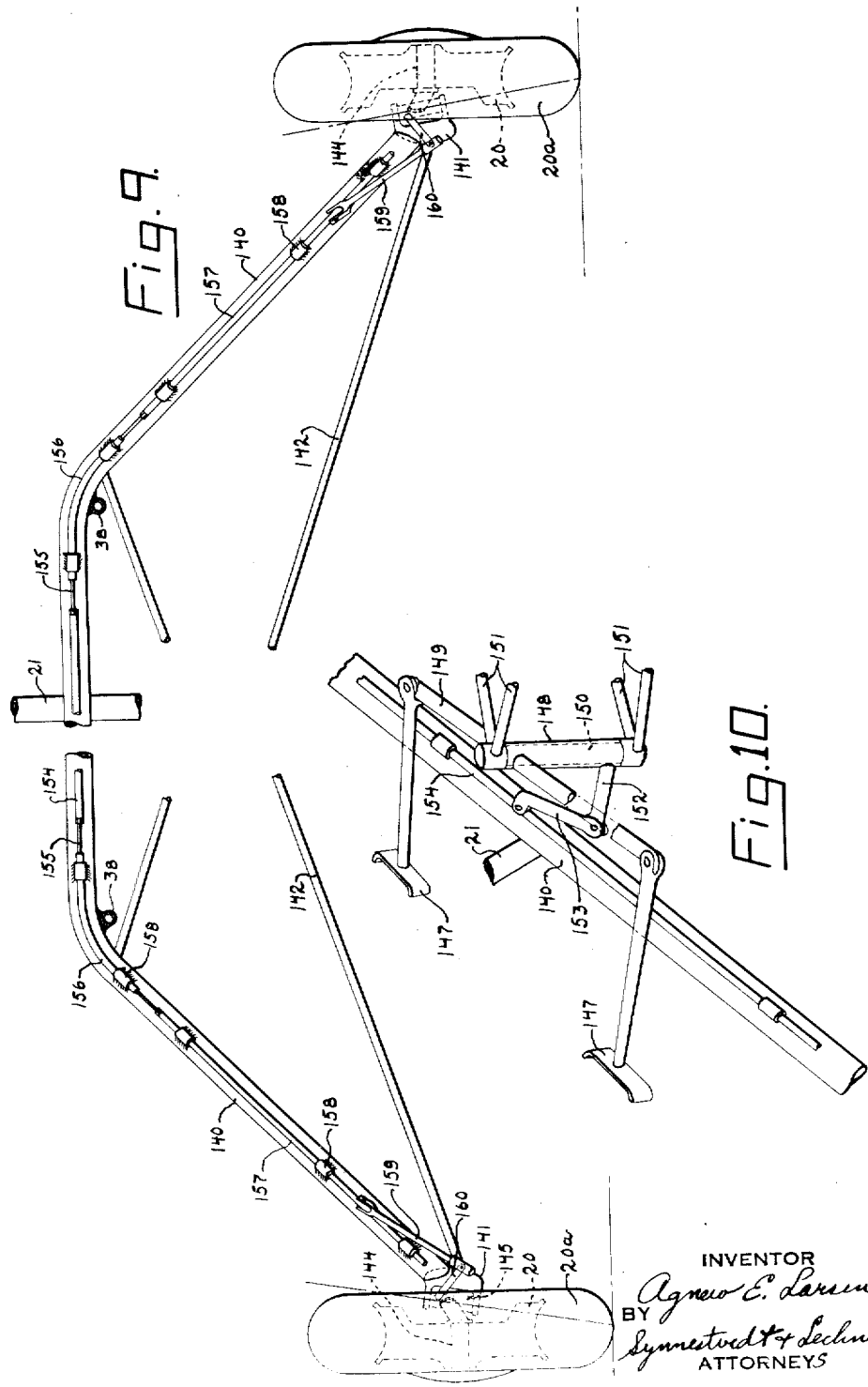

Patented Apr. 25, 1939

2,155,426

UNITED STATES PATENT OFFICE 2,155,426

ROTATIVE-WINGED AIRCRAFT

Agnew E. Larsen, Huntingdon Valley, Pa., assignor, by mesne assignments, to Autogiro Company of America, a corporation of Delaware Application September 9, 1935, Serial No. 39,671

23 Claims. (Cl. 244—18)

This invention relates to aircraft, especially rotative-winged aircraft, and is particularly adapted to that type of craft in which the rotative wings are normally autorotationally turned in flight by the action of the relative air flow, and further in which the rotative sustaining wing system is utilized also for the control of the craft in flight, and although in its broader aspects the invention is not limited solely to the said type, it will be herein illustrated and described with reference thereto.

In addition to normal horizontal flight, rotative-winged aircraft are especially adapted to vertical or near-vertical flight, being particularly suited to steep or vertical descent for landing in small areas, and as is now well known, this characteristic style of flight (which was first achieved in a reliable-commercial form by the autorotative-winged machine, as exemplified in United States patent to Juan de la Cierva, No. 1,590,496) has introduced into the field of heavier-than-air craft a number of unusual structural and operating characteristics. In addition, the development of machines in which the rotor combines the functions of sustention and control (as exemplified, for instance in Cierva United States Patent No. 1,678,935 and pending application No. 645,985, or in the corresponding British Patent Nos. 264,286 and 393,976) has brought forth still other novel structural and operating characteristics. A brief survey of some of these characteristics with certain of their attendant problems will bring out clearly the objects and advantages of the present invention.

The steep descent, on an even keel, of rotative-winged aircraft can be accomplished with little or no roll upon the ground when alighting, especially by checking the craft's movement by a rapid increase in the angle of attack of the machine and thus of the rotor just before reaching the ground, but one of the possible results of this maneuver, under certain conditions of wind and/or terrain, when the machine is in the hands of an unskilled pilot, is to produce a sharp turning to the right or left, upon landing, particularly if the machine comes in with a lateral drift. In addition, especially when landing under conditions of little or no wind, substantial loads are apt to be imposed upon the alighting mechanism and other parts of the aircraft structure. Furthermore, the sharp turning or "ground looping", which has in some instances occurred, has resulted in the machine tipping over to a degree which has caused a fouling of the rotor upon the ground and consequent damage to the rotor blades.

The "direct control", that is the combining of the control and sustaining functions in the rotor, which is preferably structurally accomplished by rendering the rotor axis tiltable in all directions for control purposes, has greatly increased the capabilities of the machine and made possible even steeper descent under full control as well as improved the take-off characteristics. Furthermore, this type of control, which in most instances eliminates the necessity for ailerons and elevators, and in some cases even the rudder, makes it quite practicable to dispense with supplemental fixed wings such as shown for example in Cierva United States Patent No. 1,948,455. This has, in turn, however, introduced certain problems in the construction of the fuselage and landing gear as well as the rotor mounting pylon. For instance, it imposes substantial variation in the thrust line position of the rotor and novel stresses upon the pylon and fuselage, as well as undercarriage, while at the same time the elimination of fixed wings has in some instances complicated the arrangements for mounting the undercarriage wheels which were heretofore positioned beneath the fixed wings at a considerable distance laterally of the body of the craft so as to provide a wide base of support to accommodate the vertical descent.

Another development in this field has been the folding of the rotor blades and fixed wings (for example as seen in Campbell U. S. Patent No. 1,989,544 and Cierva U. S. Patent No. 1,994,465) to facilitate storage and parking. By eliminating the fixed wings and ailerons and utilizing the rotor for control, the machine is still further improved in this respect, since only the rotor blades need then be folded, and the undercarriage can be brought in to a width approximating the width of the tail. It thus becomes feasible to taxi the machine from an emergency landing place to a good place for take-off, or to travel along the road when desired, but these possibilities have not, prior to my invention, been fully utilized, owing partly to the lack of satisfactory steerable undercarriages and other features requisite to a practical machine of such a type.

One of the primary objects of the present invention is to improve the machine as a whole, and particularly the fuselage, undercarriage and pylon, especially from the standpoint of overcoming the problems incident to the foregoing developments and taking full advantage of the opportunities latently present therein. As will later appear, some of the improved features also have a wider range of application.

More particularly, the invention contemplates the concentration of a substantial part of the fuselage structure, and preferably also of the pylon and undercarriage structures, along the central vertical longitudinal plane of the aircraft, thus producing, in effect, a central web, keel, or backbone, with the lateral contour-defining structure of the body carried in large part by said central longitudinal frame. The vertical tail fin, and the rudder if any, is preferably arranged in alignment with this central vertical frame and may be a direct continuation thereof or alternatively may be attached thereto by a fuselage extension of the more usual box-frame construction.

Still more specifically, the invention contemplates a triangulated construction, with the propulsion engine mounted adjacent the forward point of the triangle, the main alighting means located adjacent the rear corner of the triangle, and the rotor hub mounted at the upper apex of the triangle; the invention further involving the employment of a two-leg rotor pylon to form the foundation of the front and rear sides of the triangle, and a longitudinally extending vertical truss to form the foundation of the base of the triangle.

Another important object of the invention is to provide an undercarriage structure, cooperating with the above described fuselage framing, arranged to automatically compensate for undesirable drift of the machine, upon landing, this being preferably accomplished by inverting the usual relative locations of the center of gravity and the major supporting element of the undercarriage. Heretofore it has been customary to place the major load carrying wheels of the undercarriage just slightly ahead of the center of gravity of the machine, but according to the present invention the major element of support is constituted by a single wheel of substantial construction, and preferably also of considerable diameter, located slightly behind the center of gravity. This central wheel is preferably recessed to a considerable extent within the body of the fuselage and is mounted on a pivoted fork or frame, in position to cushion a substantial part of the vertical landing load by means of a shock strut extending upwardly substantially in alignment with the rear leg of the pylon. The remaining two points of support are preferably constituted by a pair of smaller wheels spaced laterally of the machine, well forwardly, preferably near the transverse plane of the engine at the nose of the craft, and the main compression struts for these two wheels are preferably in substantial alignment, viewed in side elevation, with the forward pylon leg. The relative disposition of the axis of the rear wheel and the axis of the front wheels with respect to the center of gravity may be made such that approximately half or more of the total weight of the machine comes upon the rear wheel when the aircraft is at rest, and even a substantially larger proportion, if desired, when the aircraft is tilted back, as upon landing. One or more skids may be provided, to the rear of the main wheel, to protect the empennage and produce a balancing effect in case the machine lands at too great an inclination, although these would not normally come into play.

Still another object of the invention involves the utilization of the main, rear wheel for braking purposes and the two forward wheels for steering purposes, the latter being also provided with a self-centering caster action, permitting automatically, at least to a limited extent, freedom for castering when landing with a side drift, so that the machine may readily turn into the direction of drift, under the influence of the side thrust, acting through the center of gravity, about the point of contact of the rear wheel as a center.

Forther objects of the invention are: to arrange the disposable loads approximately beneath the center of gravity (longitudinally considered) and to mount or support them at least in large part in a semi-cantilever fashion at each side of the central vertical truss; to utilize the side ribbing or contour-defining structure to form door-framing, particularly where a cabin design is desired; to provide longitudinal bracing between the fore and aft pylon legs, substantially in the plane of the cabin roof, so as to serve also as a part of the roof structure and to form a mounting for the control stick, which latter is preferably thus suspended from above and extends downwardly into the center of the cabin between the seats which are arranged side by side; to extend the control connections from the pivotal mounting of the control stick upwardly between the two pylon legs for connection to a housing or casing which internally carries the rotative hub of the rotor and is externally pivotally mounted in a tiltable support at the apex of the pylon, whereby a greatly improved direct control, with a minimum of joints and lost motion is provided; and to fair or enclose the pylon legs, braces, rotor control members, and other parts if desired, in an upright shell or fin, which latter is preferably set at a slight angle to the vertical longitudinal plane or given a camber, such as to produce a lateral thrust under the influence of the slip-stream in a direction to counteract the torque reaction of the propulsion engine.

How the foregoing objects and advantages, together with such others as may be incident to the invention, or will occur to those skilled in the art, are attained, will appear more clearly from the following description, taken together with the accompanying drawings, wherein—

Figure 5 is a fragmentary side view, on a larger scale, of the pylon structure, rotor hub, rotor controls, and associated parts;

Figure 9 is a front elevational view of the forward portion of the undercarriage; and Figure 10 is a perspective view illustrating the connection of the foot pedals to the steering gear of the wheels.

Figure 1:
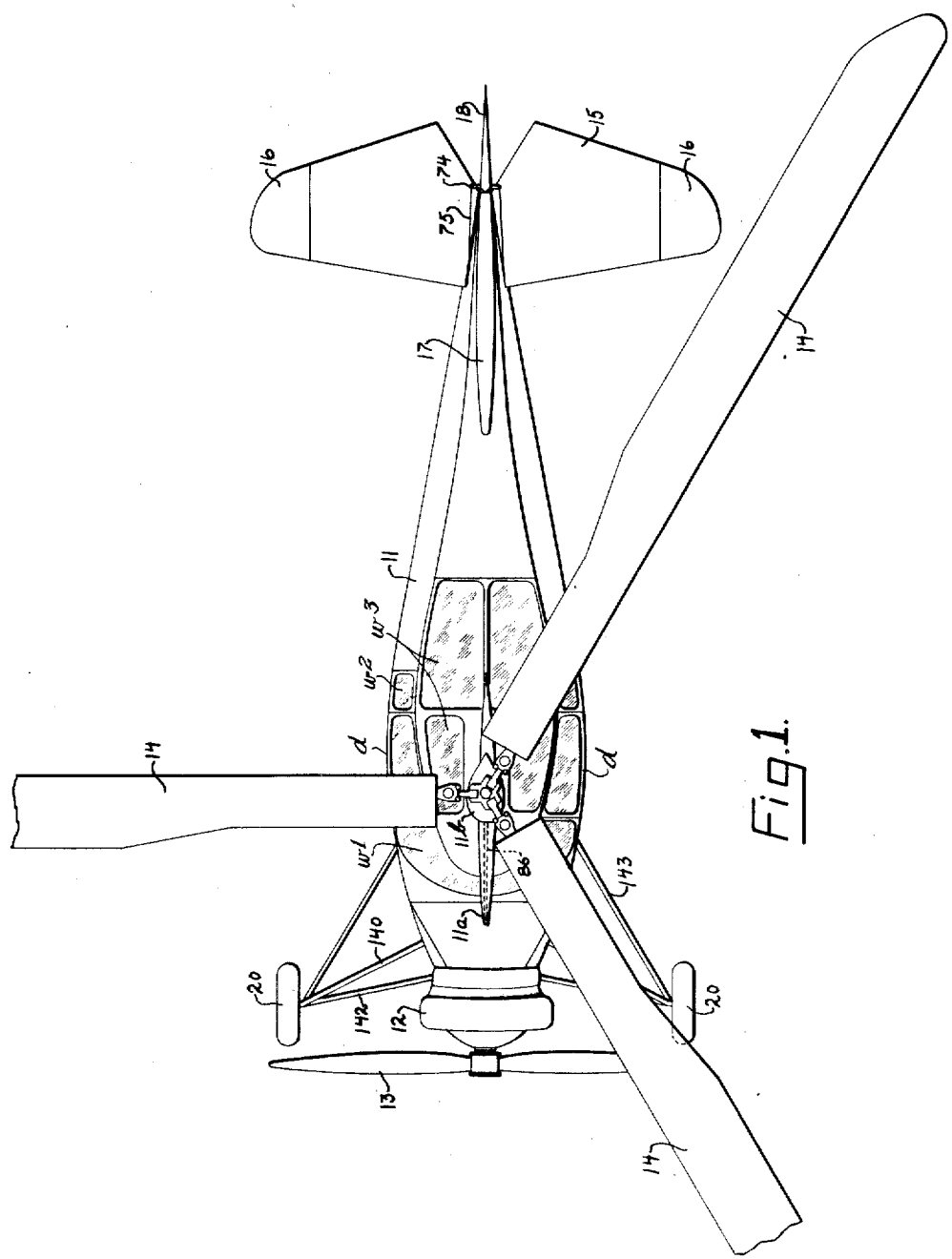
Figure 1 is a plan view of a cabin aircraft, of the direct-control, autorotative-wing type, embodying the present invention.
Figure 2:
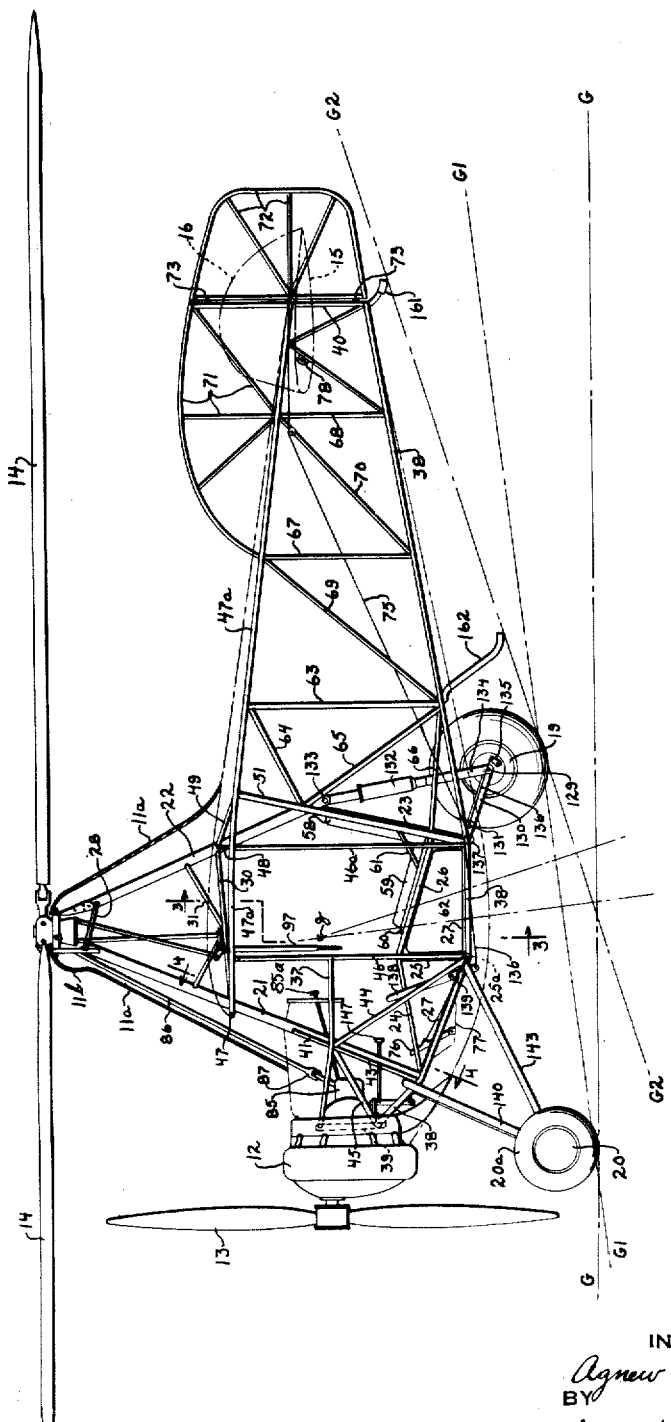
Figure 2 is a skeleton view, in side elevation, of the same aircraft, with certain parts omitted for the sake of clarity.

By reference first to Figures 1 and 2, it will be seen that the aircraft comprises, in general, a body 11, engine 12, propeller 13, autorotative sustaining blades or wings 14, horizontal tail fin 15 with upturned tips 16, vertical tail fin 17 and rudder 18, and an undercarriage including a centrally located single main wheel 19 and two forwardly and laterally positioned supplemental wheels 20. Ample vision is secured by virtue of the glassed side door d, and the front, side, and roof windows $w^1$, $w^2$, and $w^3$.

Figure 3:
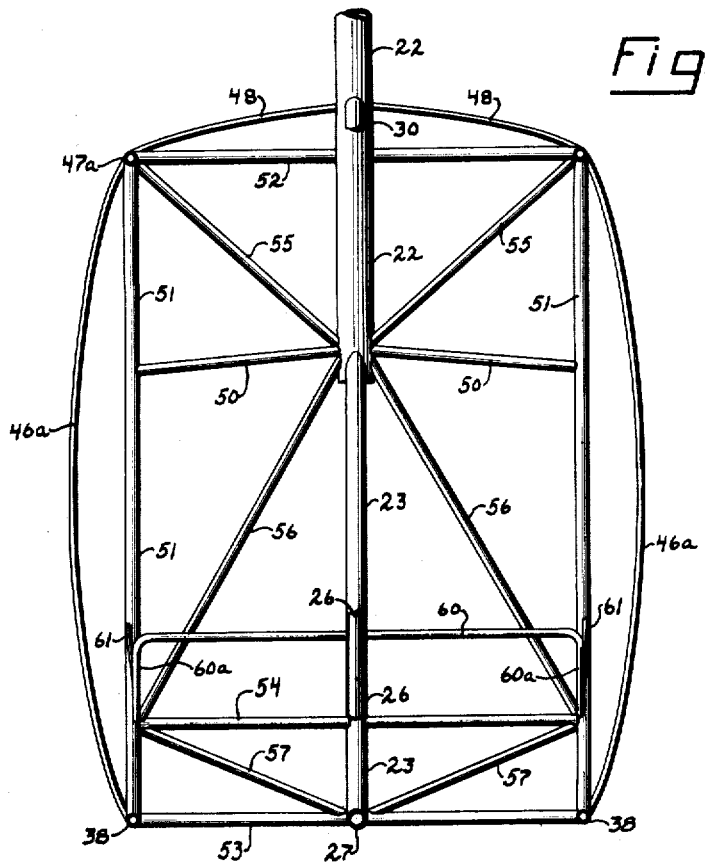
Figure 3 is a transverse sectional view, with parts in elevation, taken approximately on the line 3—3 of Figure 2, and showing parts of the side framing as secured to the main central frame in the region of the rear pylon leg.
Figure 4:
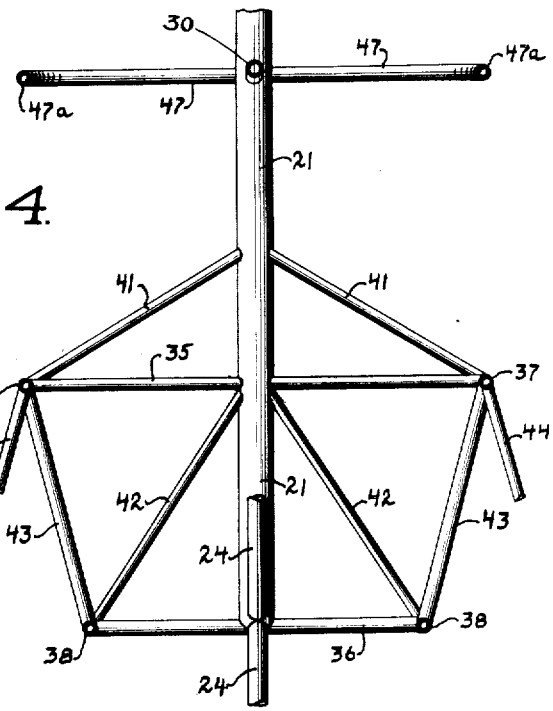
Figure 4 is a similar sectional view taken about on the line 4—4, to illustrate some of the lateral structure connected with the front pylon leg.

Referring now to Figures 2, 3 and 4, it will be seen that the major load carrying structure of the aircraft body (which is preferably made throughout of steel tubing, welded at the joints) is in the form of a central vertical frame or keel comprising the front pylon leg 21, the rear pylon leg 22 with its central upright brace 23, and the longitudinally extending truss structure lying in a central vertical plane and made up of members such as 24, 25, 26 and 27; the two members 24 being preferably connected at a common meeting point to the lower end of the front pylon leg 21, and being interconnected by a vertical member 25 at their juncture with the members 26 and 27, which latter are, in turn, connected at vertically spaced-apart points to the approximately upright member 23.

Figure 6:
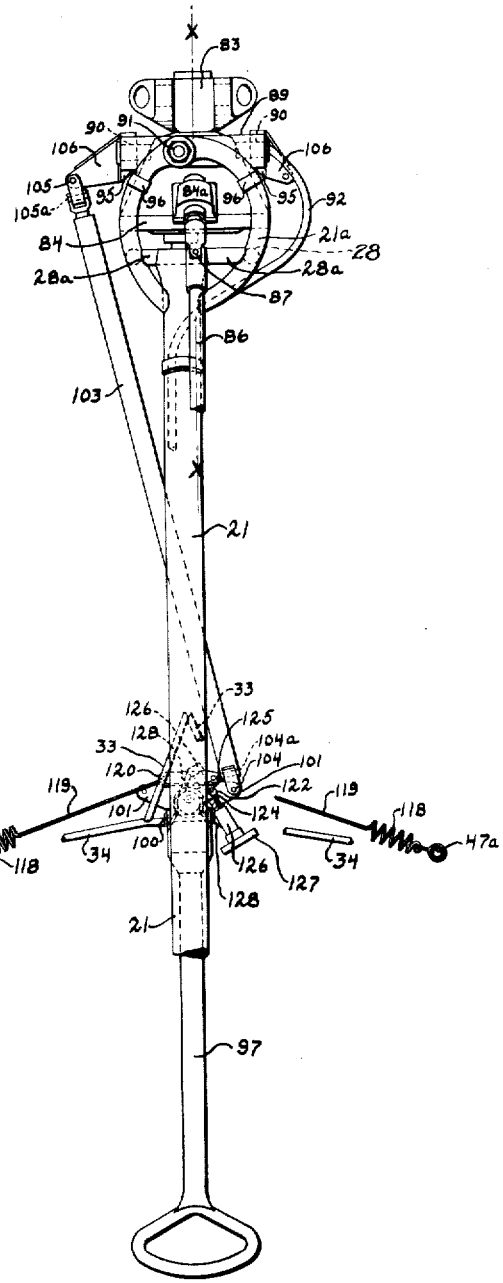
Figure 6 is a similar view taken in front elevation.

As best seen in Figures 5 and 6, the upper point of this generally triangular keel is braced or completed by a suitable cross connection 28 between the pylon legs, formed as a pair of laterally spaced tubes, one at each side of the pylon, which may be further braced by the transverse member 28a and the vertically and laterally arched side members 29. At the plane of the cabin roof, the pylon legs are interbraced by a central horizontal member 30, which not only serves to define such roof and to interbrace the pylon but also as a support for the rotor control mechanism later to be described. A truss may also be formed at this point, if desired, as by means of the central diagonal members 31, 32, and the pair of laterally inclined diagonal members 33, which extend diagonally downwardly, rearwardly and laterally from the forward pylon leg 21 to points of connection with roof members 34. The mounting of the rotor at the apex of the central frame will be described later, as will also the mounting of the engine and of the main central landing wheel.

Referring again to Figures 2, 3 and 4, it will be seen that the main central frame is laterally braced by a number of members (most of them of lighter gauge or size than the members making up said main frame) which cooperate in forming the general shell or contour-defining structure of the body or fuselage, as will now be described:

In the region of the front pylon leg (which is viewed from the rear, in Figure 4) there are two transverse members 35, 36, the upper of which connects the pylon leg 21 with the two short upper longitudinal members 37, and the lower of which connects the base of the pylon leg (where it joins the members 24 of the central truss) to the two lower longitudinals 38, which latter extend (with several variations in angle) all the way from the engine mounting ring 39 to the tail post 40. The longitudinals 37 and 38 are preferably lighter in weight than the normal longérons of the usual aircraft body, since a major part of the loads is taken by the main central frame, and further because there are no fixed wings or ailerons to impose substantial lifting, rolling, or other moments upon these members. In the same plane with the pylon leg 21 and its transverse braces 35 and 36 are two upper diagonal braces 41 and two lower diagonal braces 42, and between the points of juncture of these diagonals with the longitudinals 37 and 38 are located uprights or side members 43, which completes the transverse bracing frame or bulkhead for this region.

The upper and lower longitudinals 37 and 38 may be further interbraced by the interconnecting side diagonals 44 and 45, each diagonal brace 44 extending downwardly, rearwardly and laterally to the point of juncture of the respective lower longitudinal 38 with the side door frame member 46, and each diagonal brace 45 extending downwardly, forwardly and inwardly to the point of juncture of the respective lower longitudinal 38 with the engine mount 39. In addition, the lower longitudinals may be joined by a transversal 25a which also braces the central truss at the region of its upright member 25.

At some distance above the upper longitudinals 37, that is, at the region of the cabin roof, there is a member 47 secured to the front of the pylon leg, in a transverse position, and curved from that point rearwardly to form a pair of side longitudinals 47a, which define the upper side edges of the cabin, and extend all the way back to the tail post 40. The member 47 is joined to the pylon leg at the point of juncture of the pylon brace 30 therewith, and as said member bends rearwardly, its longitudinal extensions 47a are braced by the cabin roof members 34, 48 and 49. The upper ends of the door frame members 46 are connected to the longitudinals 47a, as are also the door frame members 46a. Both the front and rear door posts or frame members, 46 and 46a, are laterally outwardly bowed (as seen in Figure 3) to conform to the curvature of the cabin walls and doors.

In the region of the rear pylon leg (which is viewed from the front, in Figure 3) there is a transversal 50 extending laterally at each side, from the root of said leg to a point of connection with an upright side member 51 which is inclined upwardly and rearwardly when viewed in side elevation (see Figure 2). The uprights 51 interconnect the upper and lower longitudinals 47a and 38. In the plane of the uprights 51 there is a transversal 52 which lies behind the pylon leg and interconnects the upper longitudinals 47a; there is a lower transversal 53 which interconnects the lower longitudinals 38 and laterally braces the lower longitudinal member 27 of the central vertical truss at the point of juncture thereof with the main upright brace 23 of the pylon leg; and finally there is a transversal 54 (in the same plane with the parts 51, 52, 53 and 23) which interbraces the side members 51 and the central member 23 at the point of juncture of the latter member with the upper longitudinal element 26 of the central truss. This bulkhead is completed by the three pairs of diagonals (lying in the said plane) numbered 55, 56 and 57.

This rear bulkhead, in addition to its transverse bracing functions, forms the basis of support for the back of the two side-by-side occupants' seats (one of which is shown at 58 in Figure 2). The seats themselves (as indicated at 59) are carried on a U-shaped frame 60, the transverse part of which rests centrally upon the upper longitudinal member 26 of the central truss, and the legs of which extend rearwardly at a downward inclination, as seen at 60a in Figure 3, for connection with the uprights 51 at the juncture therewith of the transverse member 54. The sides of this U-shaped seat supporting frame may be further braced as by the diagonal members 61 connected to said uprights 51. The main fuel tank and/or other disposable load, indicated at 62, is slipped into place by a transverse movement, to fit into the space beneath the seats 59 and to be supported by the central vertical truss in addition to the lower side longitudinals.

Continuing with the body structure, shown generally in Figure 2, it will be seen that at the next station behind the rear bulkhead the upper and lower longitudinals 47a and 38 are connected by side uprights 63. At the point of juncture of each upright 63 with the upper longitudinal 47a there is joined a diagonal 64 which extends laterally inwardly to a juncture with the base of the pylon leg 22; and from the same point on the pylon leg there are similarly divergent diagonals 65, each of which extends to a point of juncture between the upright 63 and the lower longitudinal 38. From the latter points there are additional diagonals 66 which converge to the central point of intersection of the main vertical brace member 23 and the transversal 54 in the rear bulkhead.

From station 63 rearwardly, the body frame may be of ordinary box construction, the longitudinals 47a and 38 being joined by uprights 67, 68, diagonals 69, 70 and the like, and upper and lower transversals (not shown); the metallic tubular framing 71 of the vertical fin 17 being mounted in the usual position, and the framing 72 of the rudder 18 being hinged at the tail post, as indicated at 73, and operated by the control horns 74 (Figure 1) through the intermediation of cables 75 which pass over suitable pulleys and are connected to the foot pedals 76 mounted on the cabin floor 77. The horizontal tail fin 15 with its upturned tips 16 may be pivotally mounted by means of its main tube, which is indicated at 78, to serve as an adjustable stabilizer, if desired.

The mounting and control of the rotor will now be described, with reference chiefly to Figures 5 and 6. The rotor blades 14 are mounted by means of the vertical pivots 79, links 80, horizontal pivots 81, and fixed lugs or ears 82, upon the rotative hub or spindle 83, which latter extends downwardly into the conical casing 84 wherein it is mounted for free rotation by antifriction bearings (not shown). Said casing also encloses a rotor brake, and a ring gear connectible with the internal rotating spindle through the intermediation of an overrunning clutch, the ring gear being driven by a pinion enclosed in the small casing 84a fastened to the forward face of the casing 84. These internal parts need not here be shown or further described, as they may take the form of the mechanism shown in the copending application of Joseph S. Pecker, Serial No. 620,076, (issued April 14, 1936 as Patent No. 2,037,433) or other suitable construction.

The drive from the propulsion engine to the rotor, for starting the latter prior to take-off, is by means of a manual clutch indicated at 85 in Figure 2, having a control 85a at the dashboard, for actuating shaft 86 connected to the pinion shaft 86a, the shaft 86 having upper and lower universal joints 87 as well as a slipjoint 88 to permit free tilting movements of the rotor for control purposes after the manner of the aforementioned copending application of Juan de la Cierva, Serial No. 645,985.

The pivotal mounting itself primarily comprises an open frame or gimbal ring 89, partially (or wholly, as here shown) surrounding a peripheral portion of the casing 84, in which said casing is pivoted on a transverse axis as at 90, 90 and which in turn is pivoted on a longitudinal axis as at 91, 91 upon the upper extension 22a of the rear pylon leg and the ring-like upper extension 21a of the forward pylon leg; the axes 90 and 91 being horizontally offset from the central hub axis $x$—$x$, in accordance with the teaching of the Cierva application just mentioned.

The novel rotor tilting arrangement above described (that is, with the rotating hub or spindle located internally of the casing 84, and the tilting mounting located externally thereof) is extremely advantageous from the standpoint of compactness, simplicity and ruggedness, and ease of inspection and assembly, and further from the standpoint of facilitating the location of the rotor control or tilting pivots close to the plane of the rotor blades themselves. It will also be seen that this arrangement provides ample clearance for the rotor driving parts, the pinion casing 84a being rigidly secured to the main hub casing 84 in a position centrally of the opening through the annular member 21a. This embodiment also provides for a rotor brake connection passing in through the hollow axis of the pivot 90, as a result of which the tilting movements of the rotor impose no disturbing effect upon the rotor brake operation. The brake connection itself may take various forms, but the present preferred embodiment is the flexible tube-enclosed cable 92, which is extended downwardly along the front pylon leg 21, and can be carried from thence to any convenient point in the cabin. This rotor mounting also conveniently provides for carrying the flexible tachometer shaft 92a downwardly from the center of hub casing 84, intermediate the fore and aft pylon legs, and laterally between the side pylon braces 28, and thence downwardly along the front pylon leg, as shown.

Still another feature of the above arrangement is the provision of inclined rotor tilting stops or faces 93, 94, upon the inner peripheral face of the gimbal ring 89, in position to cooperate with the exterior surface of the casing 84 for limiting the fore and aft tilting of the rotor; and the provision of similar surfaces 95, 95 on said gimbal ring for abutment against the stops 96, 96 secured to the annular extension of the front pylon leg for limiting lateral tilting of the rotor. As shown, the various stops can desirably be given such clearances as to provide for approximately 3° of forward tilt of the rotor, 8° of rearward tilt, and 7° of lateral tilt on each side. The control connections themselves will now be described.

The depending or hanging control stick 97 extends downwardly into the cabin, centrally between the two seats (two sets of foot pedals and other controls being provided, if desired), and it will be seen that this stick is mounted upon the main pylon brace 30, at the region of the cabin roof, by means of a couple of fixed bearings 98, 98 in which is rotatable a short longitudinally-extending rock-shaft 99, on which the stick is pivoted at 100, the stick being forked at its upper end, as indicated at 100a, to accommodate or straddle the brace tube 30. The shaft 99 is provided with a laterally extending arm 101, and the stick itself with a forwardly extending arm 102. A push-pull tube 103 is pivoted to the lateral arm at 104, and at its upper end is pivoted at 105 to a second lateral arm 106 which extends out the opposite side of and is secured to the gimbal ring or tilting frame 89, whereby to actuate the rotor for lateral control. A similar tube 107 is pivotally connected at 108 to the forwardly extending control arm 102, and at its upper end is pivotally connected at 109 to the bottom of rotor hub casing 84, adjacent the rear thereof, it being further noted that the longitudinal control rod is connected to the casing 84 substantially in the vertical longitudinal plane containing the lateral control pivot 91, this being advantageous in preventing the longitudinal control from imposing a lateral component upon the hub. To accommodate any slight deflections of the position of one control connection when the other is operated, the control tubes may incorporate additional pivots, 104a, 105a, 108a, 109a, or the like, each positioned close to and with its axis approximately at right angles to that of the adjacent pivotal operating connections, so as to form universal joints at each end of each control rod.

It will be noted that the rock shaft 99 is provided with two of the lateral control arms 101 (see Fig. 6), one at either side; and that the tilting frame or gimbal ring 89 is similarly provided with two of the lateral control arms 106, one at either side. This makes possible the substitution of a pair of crossed cables, if desired, in place of the single push-and-pull tube 103, for the lateral control. In any event, however, whether crossed cables are used (each connected to a lower arm 101 at one side, and to an upper arm 106 at the opposite side) or whether a push-and-pull connection is employed, it should be noted that the control connection extends diagonally, and crosses the plane of the pylon, which not only results in the proper direction of tilt of the rotor and thus proper bank of the machine for a given instinctive movement of the control stick in the cabin, but also results in narrowing the necessary outside limits of the rotor mounting and control assembly, so that it becomes feasible to enclose the rotor tilting controls, as well as other parts, with the pylon, and to utilize a substantially streamlined enclosure, which may at the same time serve as a laterally-stabilizing vertical fin.

Figure 7:
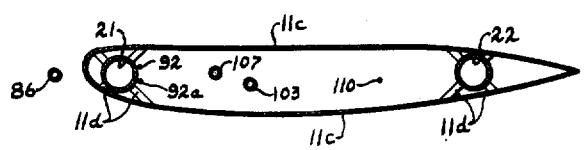
Figure 7 is a cross-sectional view through a rotor pylon and associated structure.

Such streamlined enclosure may be provided by the pylon itself being formed as a stressed shell, or may be a separate fairing; and if formed separately as a thin fairing it may conveniently be arranged in a couple of different ways. Figures 1 and 2 illustrate a construction in which the fairing 11a, merging with the covering of the fuselage 11, encloses not only the pylon with its brace tubes, the rotor control connections, and the rotor brake cable and tachometer shaft, but also extends well forwardly to enclose the rotor drive shaft, and is formed with an enlargement or hump 11b, adjacent the top, to enclose the rotor tilting mount (an aperture being provided at the top for the extension therethrough of the rotor hub proper). In the alternative arrangement of Figure 7, which is a sectional view through a pylon and the associated rotor connections, the streamline fin 11c has its nose brought around the front pylon leg, without enclosing the starter shaft 86. In either form of construction, the fin or fairing may be of thin metal sheeting secured to small brackets 11d mounted upon the pylon legs, and is preferably formed with a lateral camber (as shown in Figure 7) so that it not only serves as a stabilizing fin area above the center of gravity $g$ (which is normally rather high in this type of machine, because of the height at which the rotor must be mounted) but also in order to counteract the propeller torque reaction, which is important in this type of machine because the absence of fixed wings results in a relatively small degree of damping in roll, and further because the full range of rotor control should be available for control purposes and not partially wasted in one direction for the purpose of counteracting propeller torque.

For purposes of longitudinal stability and trim, a bias or bungee device may be employed, and in the preferred embodiment this is mounted on the pylon and associated bracing, and comprises a cable 110 secured to the hub casing 84 at the point 111, in longitudinal alignment with the control rod 107 and thus aligned with the axis of the lateral tilting pivots 91, said cable being coupled at its lower end to the lever 112 which is pivoted upon the rear pylon leg at 113, the cable being tensioned by a spring 114 which is coupled at its upper end to said lever and at its lower end to a sleeve 115 in which is screw threaded the shank of an adjusting nut 116, rotatable in but longitudinally fixed with respect to a collar 117 mounted fast on the brace tube 30. The adjusting nut 116 projects into the cabin adjacent the roof thereof, within ready reach of the pilot. The purpose and operation of the bias device need not be enlarged upon here, as its fundamental operation is similar to that described in the aforementioned Cierva application 645,985.

A lateral bias or bungee may also be employed. This may comprise a pair of springs and cables 118, 119, positioned just beneath the fairing of the cabin roof, and extending transversely of the craft. The springs are secured to the upper longitudinals 47a, and the connected cables are secured to the member 120 which is fixed upon a collar 121, freely floating on the rock-shaft 99. An arm 122 secured to said collar carries an internally threaded block 123, by means of a screw or bolt 124 working in a slotted opening 125. Longitudinally fixed but freely rotatable within a couple of bearings 126 is an adjusting screw 127 which is threaded into the block 123. The bearing members 126 are secured by the arms 128 rigidly to the rock-shaft 99. It will readily be seen that the spring held member 120 will tend to centralize the block 123 at a given point, and that adjustment of the screw or knurled nut 127 will produce adjustments of the relative angular position between said block and the rock-shaft which operates the lateral control, so that a lateral bias in one direction or the other can be imposed.

Referring now to the landing gear arrangement, it will be seen from Figure 2 that the main (rear) landing wheel 19 is positioned somewhat behind the center of gravity $g$, although not nearly as far rearwardly as is usual with aircraft tail wheels, and is thus so located as to take approximately half or more of the weight of the machine. This wheel is centrally positioned (considered laterally) and is at least partially recessed within the fuselage, between the laterally diverging braces 66, and just behind the rear upward member 23 of the central keel structure. This wheel has its axle 129 carried by a frame 130 which is pivoted at 131 to the rear bulkhead structure adjacent the rear end of the main central vertical truss. A shock strut 132, which is approximately in alignment with the rear pylon leg 22, is pivotally connected therewith at 133 and is connected with the wheel axle by the fork member 134. The wheel brake lever 135 is actuated by a cable 136 which passes forwardly in alignment with pivoted frame member 130, and thence over a pulley 137 for connection to the lower end of the brake operating lever 138 which is pivoted at 139, for example to the member 24 of the central keel. From the foregoing it is clear that the landing loads on this wheel are carried in substantial alignment with the central keel, and particularly in alignment with the rear pylon leg; and that the braking reaction is carried substantially in alignment with the lower truss of said keel.

Figure 8:
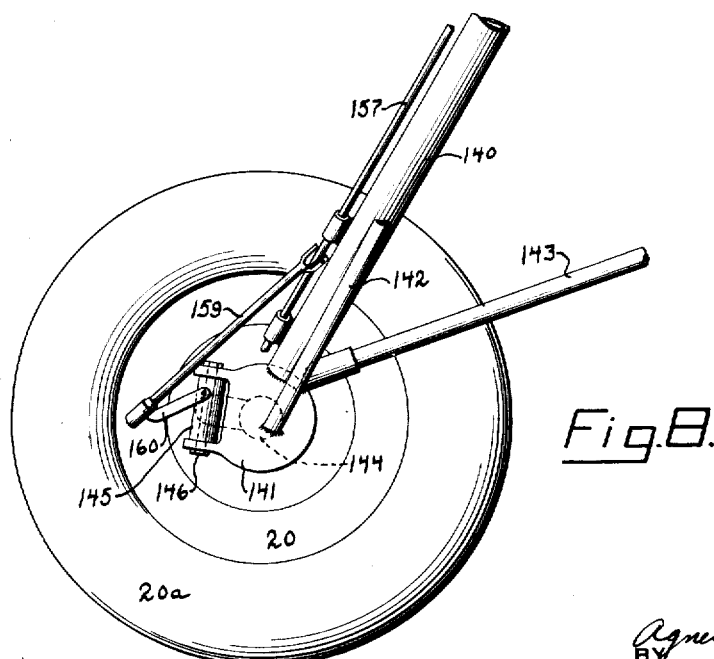
Figure 8 is an inner side elevational view of the right front wheel of the machine, illustrating fragmentarily its mounting and steering connections.

The front wheels 20, because of the fact that the initial impact of vertical landing is imposed mainly on the rear wheel, may be mounted without shock absorption means other than the tires 20a. For this purpose, a main landing gear member or axle 140 (better seen in Figures 8 to 10) is positioned to extend transversely through the fuselage and is rigidly connected at its midpoint to the base of the front pylon leg 21 adjacent the juncture therewith of the lower central truss, and is also connected to the lower side longitudinals 38 adjacent the juncture of the bracing members 43. From adjacent the lower side longitudinals 38, the main forward landing gear 140 is bent downwardly and laterally (in substantial alignment, viewed in side elevation, with the plane of the front pylon leg 21), the two ends being provided with wheel mounting trunnion members 141. Laterally considered, this assembly is braced by the diagonal tubes 142, and longitudinally considered it is braced to the fuselage by the rearwardly and inwardly extending diagonals 143.

The stub axles 144, on which the wheels 20 are free to revolve, are bent forwardly and upwardly to a point of rigid attachment with knuckles 145, pivotally secured by the knuckle pins 146 to the forks of the trunnion members 141.

It will be noted that the axis of each knuckle pin is inclined (viewed in side elevation, Fig. 8) so as to lie well forwardly of the point of contact of the wheel with the ground, which permits of an automatic centering castering action, when landing with side drift. Under such circumstances, the side thrust on the machine, acting through the center gravity g, tends to swing the machine about the point of ground contact of the main rear wheel, whereupon the front wheels pivot into the direction of drift, thus neutralizing the tendency to overturn. This action is opposite to that heretofore obtained in aircraft of this type.

The knuckle pin axis is also inclined (viewed in front elevation, Fig. 9) so as to intersect the central plane of the wheel at the level of ground contact, so that the drag reaction of the wheel will not tend to affect the castering action.

For purposes of steering on the ground, or along the road when taxying with the rotor blades folded, the front wheels may be steered by the foot pedals 147. These pedals actuate a rotatable sleeve 148, by means of the lever 149, the sleeve 148 being rotatably mounted on a fixed axis 150 which is secured to the fuselage by the brace tubes 151. An arm 152 fixed on the sleeve 148 is pivotally coupled to a link 153 which is in turn pivoted to a transverse rod 154, the latter being coupled at its ends, by means of flexible rods 155, working through the bent tubes 156, to the steering rods 157, these several parts being slidable within fixed supports or bearings 158. The final connection to the wheel knuckles is by means of the links 159 and arms 160.

Though not strictly a part of the undercarriage, there is a tail skid 161, and a pair of laterally-positioned balancing skids 162, all of which are normally out of contact with the ground. In Figure 2, the machine is depicted at cruising attitude with reference to the ground line G—G; its ground angle, at normal position of rest, is measured by the angle between the planes G—G and G1—G1; and the range of attitudes which it may assume in take-off and landing is measured by the angle between the lines G1—G1 and G2—G2. It will be observed from perpendiculars drawn through the center of gravity to the planes G1—G1 and G2—G2 that, while the center of gravity is always forward of the rear wheel, yet it is closer to said wheel than to the front wheels, and therefore the greater proportion of the weight is on the rear wheel. This not only plays an important part in the automatic compensation for drift upon landing, as previously described, but also provides a sturdy support for the loads imposed upon take-off, which is effected, with the direct control, by tilting the plane of the rotor upwards in front, thus throwing the burden of the weight toward the rear wheel.

It will be evident from the foregoing detailed description of the machine, that the contemplated objects and advantages are attained in a relatively simple manner, by an aircraft structure which is ample to sustain the loads imposed and at the same time economical of weight by virtue of the novel disposition of the various parts of the body, pylon and undercarriage.

I claim:

1. In an aircraft, sustention means comprising rotary wings and a hub, propulsion means and alighting mechanism, the hub, the propulsion means and a major load-carrying element of the alighting mechanism being centered adjacent the vertical longitudinal midplane of the craft, and a body or fuselage incorporating, as its major load carrying structure, a triangulated frame lying substantially in the central longitudinal vertical plane, having means for mounting and receiving the lift from the rotor hub adjacent the upper apex of said triangular frame, means for mounting and receiving the thrust of the propulsion means adjacent the forward apex of said frame, and means for mounting and receiving the compression loads of said major load carrying element adjacent the rear apex of said triangular frame.

2. In an aircraft, sustention means comprising rotary wings and a hub, propulsion means and alighting mechanism, the hub, the propulsion means and a major load-carrying element of the alighting mechanism being centered adjacent the vertical longitudinal midplane of the craft, and a body or fuselage incorporating, as its major load carrying structure, a triangulated frame lying substantially in the central longitudinal vertical plane, having means for mounting and receiving the lift from the rotor hub adjacent the upper apex of said triangular frame, means for mounting and receiving the thrust of the propulsion means adjacent the forward apex of said frame, means for mounting and receiving the compression loads of said major load carrying element adjacent the rear apex of said triangular frame, the foundation of the triangular framing comprising a longitudinally extending vertical truss for the base thereof, and upwardly converging rotor mounting pylon legs for the forward and rear sides of the triangular frame.

3. In an aircraft, sustention means comprising rotary wings and a hub, propulsion means and alighting mechanism, the hub, the propulsion means and a major load-carrying element of the alighting mechanism being centered adjacent the vertical longitudinal midplane of the craft, and a body or fuselage incorporating, as its major load carrying structure, a triangulated frame lying substantially in the central longitudinal vertical plane, having means for mounting and receiving the lift from the rotor hub adjacent the upper apex of said triangular frame, means for mounting and receiving the thrust of the propulsion means adjacent the forward apex of said frame and having means for mounting and supporting a major proportion of the disposable or useful load adjacent the rear apex of said frame.

4. An aircraft comprising a body, an autorotatable sustaining rotor approximately centered above the center of gravity of the craft, a centrally positioned landing wheel, and a pair of laterally positioned landing wheels located well forwardly, the said pair of wheels being located substantially ahead of the center of gravity of the craft, and said first mentioned wheel being located behind said center of gravity but closer to the transverse plane thereof than the forwardly positioned wheels.

5. An aircraft comprising a body, an autorotatable sustaining rotor approximately centered above the center of gravity of the craft, a centrally positioned landing wheel, and a pair of laterally positioned landing wheels located well forwardly, the said pair of wheels being located substantially ahead of the center of gravity of the craft, said first mentioned wheel being located behind said center of gravity but closer to the transverse plane thereof than the forwardly positioned wheels, and a main load carrying frame for the body positioned in the vertical midplane thereof.

6. An aircraft comprising a body, an autorotatable sustaining rotor approximately centered above the center of gravity of the craft, a centrally positioned landing wheel located near the center of gravity of the craft, and a pair of laterally positioned landing wheels located well forwardly, said forward wheels having means for automatic castering action.

7. An aircraft comprising a body, an autorotatable sustaining rotor approximately centered above the center of gravity of the craft, a centrally positioned landing wheel located near the center of gravity of the craft, and a pair of laterally positioned landing wheels located well forwardly, said forward wheels having means for automatic castering action, and means for steering said forward wheels.

8. An aircraft comprising a body, an autorotatable sustaining rotor approximately centered above the center of gravity of the craft, a centrally positioned landing wheel, and a pair of laterally positioned landing wheels located well forwardly, said central wheel being located behind the center of gravity of the craft but closer thereto than the pair of forward wheels, and means providing an automatic castering action for the forward wheels, whereby, when the craft lands with a lateral drift, it will tend to swing about the rear wheel as a pivot in a direction to negative the detrimental drift effects.

9. An aircraft comprising a body, an autorotatable sustaining rotor approximately centered above the center of gravity of the craft, a main alighting element laterally centralized beneath the body and longitudinally positioned relatively close to the transverse plane containing the center of gravity of the craft, means mounting said element for bodily vertical movement in the longitudinal mid-plane of the craft, and a plurality of supplemental alighting elements in spaced relation both laterally and longitudinally from said main alighting element, at least two such supplemental elements being positioned forwardly of the center of gravity of the craft and having means for steering the craft.

10. An aircraft comprising a body, an autorotatable sustaining rotor approximately centered above the center of gravity of the craft, a main alighting element laterally centralized beneath the body and longitudinally positioned relatively close to the transverse plane containing the center of gravity of the craft, means mounting said element for bodily vertical movement in the longitudinal mid-plane of the craft, and a plurality of supplemental alighting elements in spaced relation both laterally and longitudinally from said main alighting element, at least two such supplemental elements being positioned forwardly of the center of gravity of the craft and having means for steering the craft, and said main element having braking means associated therewith.

11. In an aircraft having a body and a sustaining rotor, mounting means for the rotor including a compression element extending downwardly and forwardly from the rotor center into the body and compression means extended downwardly and rearwardly from the rotor center into the body, a pair of forwardly positioned alighting elements located one at each side of the body and having compression means for mounting them on the body which extend in substantial alignment, viewed in side elevation, with the said forward compression element of the rotor support, alighting means located rearwardly of those first mentioned, and compression means for securing the same to the body extending in substantial alignment, viewed in side elevation, with the rear compression element of the rotor supporting means.

12. In an aircraft having a body and a sustaining rotor, mounting means for the rotor including a compression element extending downwardly and forwardly from the rotor center into the body and compression means extended downwardly and rearwardly from the rotor center into the body, a pair of forwardly positioned alighting elements located one at each side of the body and having compression means for mounting them on the body which extend in substantial alignment, viewed in side elevation, with the said forward compression element of the rotor support, alighting means located rearwardly of those first mentioned, and compression means for securing the same to the body extending in substantial alignment, viewed in side elevation, with the rear compression element of the rotor supporting means, the last mentioned compression connection of the rear alighting means comprising shock absorption mechanism.

13. In an aircraft having a body and a sustaining rotor, mounting means for the rotor including a compression element extending downwardly and forwardly from the rotor center into the body and compression means extended downwardly and rearwardly from the rotor center into the body, a pair of forwardly positioned alighting elements located one at each side of the body and having compression means for mounting them on the body which extend in substantial alignment, viewed in side elevation, with the said forward compression element of the rotor support, alighting means located rearwardly of those first mentioned, and compression means for securing the same to the body extending in substantial alignment, viewed in side elevation, with the rear compression element of the rotor supporting means, the last mentioned compression connection of the rear alighting means comprising shock absorption mechanism laterally centralized and connected adjacent the base of the said rear element of the rotor support.

14. An aircraft comprising a body, a sustaining rotor positioned with its center in approximately vertical alignment above the center of gravity of the craft, a main alighting wheel of relatively large diameter laterally centralized and positioned behind the said center of gravity, and a pair of laterally spaced supplemental landing wheels of relatively small diameter and positioned forwardly of said center of gravity a distance greater than the rearward spacing of said main wheel from the center of gravity.

15. An aircraft comprising a body, a sustaining rotor positioned with its center in approximately vertical alignment above the center of gravity of the craft, a main alighting wheel laterally centralized and positioned behind the said center of gravity, a pair of laterally spaced supplemental landing wheels positioned forwardly of said center of gravity a distance greater than the rearward spacing of said main wheel from the center of gravity, whereby the said three wheels normally provide a 3-point support for the craft with the major part of the weight upon the rear wheel, and braking means on said rear wheel.

16. An aircraft comprising a body, a sustaining rotor positioned with its center in approximately vertical alignment above the center of gravity of the craft, a main alighting wheel laterally centralized and positioned behind the said center of gravity, a pair of laterally spaced supplemental landing wheels positioned forwardly of said center of gravity a distance greater than the rearward spacing of said main wheel from the center of gravity, whereby the said three wheels normally provide a 3-point support for the craft with the major part of the weight upon the rear wheel, together with mechanism for shifting the lift line of the rotor for control purposes, and normally inoperative supporting means for the craft located behind the rear wheel and vertically spaced above the common plane of contact of the 3-point support in position for contact if the craft alights at an excessive ground angle.

17. An aircraft comprising a cabin-type body, a sustaining rotor thereabove, forward and rearward pylon legs for mounting said rotor, bracing between said legs positioned to form part of the cabin roof structure, means for shifting the rotor lift line for control purposes, and control mechanism connected to said means and movably mounted upon said pylon bracing, said control mechanism including a universally movable control stick pivoted at its upper end adjacent the plane of the cabin roof and extending downwardly into the cabin adjacent the occupant's position and control connections extending from the plane of the roof and upwardly to the rotor.

18. An aircraft comprising a cabin-type body, a sustaining rotor thereabove, forward and rearward pylon legs for mounting said rotor, braces between said legs positioned to form part of the cabin roof structure, means for shifting the rotor lift line for control purposes, control mechanism connected to said means and movably mounted upon said pylon bracing, said control mechanism including a universally movable control stick pivoted at its upper end adjacent the plane of the cabin roof and extending downwardly into the cabin adjacent the occupant's position, and main framing for the body incorporating said pylon legs as a part thereof and positioned in the central longitudinal vertical plane of the craft, a seat for an occupant upon each side of said central framing, and said control stick being located centrally between said two seats.

19. In an aircraft having a body and a sustaining rotor thereabove, supporting and bracing structure for mounting the rotor above the body located in large part in the central vertical longitudinal plane, means for shifting the lift line of the rotor for control purposes, control mechanism for said means including a control member mounted on said structure for lateral and longitudinal movement and connections from said member to the rotor, said connections including a longitudinal control connection located substantially in said plane, and a lateral control connection extending at a slight angle to and crossing said plane.

20. An aircraft comprising as a major load-carrying part of the frame a central longitudinal vertical keel and a rotor pylon both in large part consisting of structural members lying in the vertical longitudinal midplane of the craft, a sustaining rotor centralized at the top of said pylon and pivotally mounted thereon, control connections for controllably tilting the rotor lying approximately in said central vertical plane, a propulsion engine mounted adjacent the end of said central keel, a rotor starter connection extending from said engine adjacent the said central plane up to the rotor, with means at its upper end for accommodating the rotor tilting movements, and a central vertical stabilizing fin enclosing and streamlining a number of the upwardly projecting parts in said central vertical plane, said fin being a large part positioned within the slip-stream of said propulsion means and being formed to produce by reaction therewith a rolling couple substantially equal and opposite to the torque reaction of the propulsion means whereby even in the absence of fixed wings and ailerons the full range of rotor control may be reserved for control purposes.

21. An aircraft comprising a body, a normally autorotative sustaining rotor thereabove, a streamlined pylon at the apex of which the rotor is tiltably mounted for control of the craft, a propulsion engine, a propeller driven thereby and located forward of said pylon, the streamlining of the pylon being shaped and positioned to produce by reaction with the slipstream of the propulsion means a rolling couple substantially equal and opposite to the torque reaction of the propulsion means wherby even in the absence of fixed wings and ailerons the full range of rotor control may be reserved for control purposes.

22. In an aircraft having a sustaining rotor, a body structure comprising framing defining the cross-sectional contour of the body and a main strength structure lying within said framing, the main strength structure consisting in large part of structural members extended and lying in the longitudinal vertical midplane of the body and to which said framing is connected toward the upper and lower sides of the body, means for connecting said rotor to said main strength structure in the plane of the structural members thereof, and a single main alighting element located close to the center of gravity of the craft and connected with said main strength structure in the plane of said structural members thereof.

23. In an aircraft having a sustaining rotor, a body structure comprising framing defining the cross-sectional contour of the body and a main strength structure lying within said framing, the main strength structure consisting in large part of structural members extended and lying in the longitudinal vertical midplane of the body and to which said framing is connected toward the upper and lower sides of the body, means for connecting said rotor to said main strength structure in the plane of the structural members thereof, a single main alighting element located close to the center of gravity of the craft and connected with said main strength structure in the plane of said structural members thereof, and a pair of additional alighting elements positioned well forward of the center of gravity of the craft and laterally offset from each side of the craft.

AGNEW E. LARSEN.

CERTIFICATE OF CORRECTION.

Patent No. 2,155,426. April 25, 1939.

AGNEW E. LARSEN.

It is hereby certified that error appears in the printed specification of the above numbered patent requiring correction as follows: Page 3, first column, line 13, for "door" read doors; page 8, second column, line 15-16, claim 19, for "sustainthe" read sustaining; line 64, claim 21, for "wherby" read whereby; and that the said Letters Patent should be read with this correction therein that the same may conform to the record of the case in the Patent Office.

Signed and sealed this 30th day of May, A.D. 1939.

(Seal)

Henry Van Arsdale
Acting Commissioner of Patents.

connecting said rotor to said main strength structure in the plane of the structural members thereof, and a single main alighting element located close to the center of gravity of the craft and connected with said main strength structure in the plane of said structural members thereof.

23. In an aircraft having a sustaining rotor, a body structure comprising framing defining the cross-sectional contour of the body and a main strength structure lying within said framing, the main strength structure consisting in large part of structural members extended and lying in the longitudinal vertical midplane of the body and to which said framing is connected toward the upper and lower sides of the body, means for connecting said rotor to said main strength structure in the plane of the structural members thereof, a single main alighting element located close to the center of gravity of the craft and connected with said main strength structure in the plane of said structural members thereof, and a pair of additional alighting elements positioned well forward of the center of gravity of the craft and laterally offset from each side of the craft.

AGNEW E. LARSEN.

CERTIFICATE OF CORRECTION.

Patent No. 2,155,426. April 25, 1939.

AGNEW E. LARSEN.

It is hereby certified that error appears in the printed specification of the above numbered patent requiring correction as follows: Page 3, first column, line 13, for "door" read doors; page 8, second column, line 15-16, claim 19, for "sustainthe" read sustaining; line 64, claim 21, for "wherby" read whereby; and that the said Letters Patent should be read with this correction therein that the same may conform to the record of the case in the Patent Office.

Signed and sealed this 30th day of May, A.D. 1939.

(Seal)

Henry Van Arsdale
Acting Commissioner of Patents.